UNITED STATES PATENT OFFICE.

SHUNJIRO ARAKI, OF OSAKA, JAPAN.

PROCESS OF PREPARING PURE ZINC-SULFATE SOLUTION FROM ZINC ORES.

1,185,757.  Specification of Letters Patent.  Patented June 6, 1916.

No Drawing.  Application filed September 6, 1913.  Serial No. 788,367.

*To all whom it may concern:*

Be it known that I, SHUNJIRO ARAKI, a subject of the Emperor of Japan, and a resident of the city of Osaka, Japan, have invented certain new and useful Improvements in Processes of Preparing Pure Zinc-Sulfate Solution from Zinc Ores, of which the following is a specification.

This invention relates to a process of preparing a pure zinc sulfate solution; and it comprises a process of preparing such a solution from zinc ores, and particularly from roasted zinc ores of a silicate nature, by treating the roasted ore with the chemical equivalent of a sodium bisulfate solution to dissolve out the zinc as well as other metals soluble in this reagent, then removing from the resulting solution the heavier metals by treatment with zinc in the form of sheets or dust, subsequently neutralizing the filtrate with alkali and mixing therewith a suitable oxidizing agent to precipitate the greater portion of the impurities such as iron, manganese, etc., and finally boiling the partially purified solution with hydrated silica or silicic acid, formed by neutralizing the sodium silicate with acids, to remove the remainder of the iron and manganese; and it also comprises, as a novel subprocess, the removal of small amounts of iron and manganese from such partially purified solutions by the precipitation therein of gelatinous and colloidal silicic acid, by the decomposition of sodium silicate with a suitable acid, the gelatinous nature of this precipitate causing a separation of most of the iron and manganese present, and the solution being subsequently heated to convert the soluble colloidal silica into the form of an insoluble gelatinous precipitate, by means of which the remaining traces of dissolved iron and manganese are removed; all as more fully hereinafter set forth and as claimed.

In the extraction of zinc from its ores it is difficult to obtain solutions of zinc free from objectionable impurities. In ores, particularly roasted ores of a silicate nature, there is present after roasting a considerable amount of other metals such as copper, lead, silver, iron, manganese, etc., which can be readily removed in part, but whose complete removal is attended with unusual difficulty. Iron and manganese are readily oxidized to form the gelatinous iron hydroxid and manganese dioxid but these compounds tend to remain in solution so that the removal of the last traces is difficult to effect. Moreover, manganese dioxid, particularly in hot solutions, is present in exceedingly fine particles which pass through ordinary filtering mediums. According to the present invention these disadvantages are overcome and all objectionable impurities, such as already indicated, are removed from the zinc solution, including the dissolved iron hydroxid, probably present in the form of a colloidal sol, and the finely divided manganese dioxid. As a result a pure zinc solution is obtained from which pure white zinc oxid can be readily produced or from which pure metallic zinc can be separated by electrolysis.

According to the present invention the pulverized roasted ore is treated with the chemical equivalent of a 20% sodium bisulfate solution, the solution or leaching being promoted by stirring. The amount of the sodium bisulfate used is sufficient to extract all of the zinc, together with greater or less amounts of other metals soluble in this reagent. In such roasted ores lead is usually also present in the form of a silicate, which is decomposed by the sodium bisulfate solution. The action of this reagent, however, is much feebler than sulfuric acid upon iron and manganese compounds so that relatively less amounts of these metals are present in the resulting solution. The copper present in the ore is usually decomposed and dissolved along with the zinc. For effecting dissolution of the desired metals the mixture is heated to about 100° C. for about 30 minutes, then boiled with warm water and filtered through a suitable filtering apparatus. The resulting solution or filtrate contains the copper and zinc in solution together with lead and small amounts of silver, iron, manganese, etc. From this solution the heavy metals such as copper and lead are removed by means of zinc, used in such form as sheets or zinc dust, this reagent serving to separate out and remove these metals from the solution. The solution is next neutralized with an alkali, such as caustic soda and a suitable oxidizing agent added to effect oxidation of the iron and manganese. Various oxidizing agents can be used such as air and bleaching powder ("chlorid of lime"), etc. Most of the iron is separated in the form of gelatinous ferric hydroxid and the manganese in the form of manganese dioxid or hydroxid. There remain, however, small amounts of both of these metals in a form probably in a colloidal form such that their removal is exceedingly difficult. More or less of the iron remains dissolved, probably as a colloidal form, and the manganese also is difficult to remove completely from the solution because of its finely divided or dissolved nature. According to the present invention the remaining small amounts of these metals are removed by boiling the solution with hydrated silicic acid, sometimes known as hydrated silica, which is formed by neutralizing sodium silicate with mineral acids such as sulfuric acid. When such neutralization is effected part of the hydrated silicic acid separates out in the form of an insoluble gelatinous precipitate which carries down with it most of the suspended and finely divided impurities. The remainder of the silicic acid set free tends to remain in solution. By boiling, this dissolved colloidal silicic acid is converted into an insoluble form and is also precipitated in form of gelatinous silica, carrying down with it and removing from the zinc solution the last traces of dissolved iron and manganese.

While I do not desire to be limited by any theoretical explanation of the exact nature of the action of the silicic acid, yet the action of the silicic acid appears to be both that of a precipitant as well as that of a coagulant, throwing out of solution any iron and manganese present in a state of colloidal solution, and coagulating and carrying down with it also any finely suspended insoluble compounds of these metals. As a result the solution is entirely free from the last traces of these impurities so that it can be used directly without further purification as a pure zinc solution. By the present process it is possible to remove the indicated impurities readily by filtration since they are carried along with, and separated at the same time as, the precipitated and insoluble silicic acid or silica. The silicic acid moreover acts as a clarifying agent and removes from the solution all traces of suspended impurities in addition to the last traces of iron and manganese. From the pure zinc sulfate solution, white zinc oxid can be obtained which is free from impurities and which does not darken in color upon standing. Pure compact metallic zinc can be also obtained from this solution by electrolysis, a result heretofore difficult to attain practically.

By the use of sodium bisulfate in extracting the ore the difficultly removable impurities such as iron and manganese are reduced to a minimum at the outset so that subsequent purification steps are much simplified. By the subsequent step of removing the last traces of these impurities by silicic acid the solution, which has been maintained in a relatively pure condition throughout the process, is finally freed from the remaining traces of impurities and the desired pure zinc sulfate solution obtained. The present process accordingly is one in which only small amounts of impurities are dealt with throughout the process and one from which substantially all impurities are removed. The process moreover can be carried out in a simple, efficient and inexpensive manner.

While the present invention has been particularly described in connection with the purification of zinc sulfate solutions, with which it is of particular value, and with which it presents peculiar advantages, yet I believe this invention to be the first for the purification of impure solutions to remove therefrom the last traces of finely divided suspended particles, or the last traces of "dissolved colloidal" metal compounds, and accordingly I claim the invention thus generically, in addition to claiming it specifically in the purification of zinc sulfate solutions, with which, as already pointed out, it presents peculiar advantages.

I claim:—

1. The process of producing a pure zinc sulfate solution from zinc ores which comprises extracting the ores with a sodium bisulfate solution, removing from the solution the heavier metals by treatment with metallic zinc, separating the greater part of the iron and manganese by neutralizing with alkali and by treatment with an oxidizing agent, and removing the remainder of the iron and manganese by adding sodium silicate, neutralizing the sodium silicate with sulfuric acid to form silicic acid and sodium sulfate, and heating the resulting solution containing silicic acid to convert the dissolved colloidal silicic acid into an insoluble form.

2. The process of producing a pure zinc sulfate solution from zinc ores which comprises extracting the ores with an alkali bisulfate solution, removing from the solution the heavier metals by treatment with metallic zinc, separating the greater part of the iron and manganese by neutralizing with alkali and by treatment with an oxidizing agent, and removing the remainder of the iron and manganese by adding an alkali silicate, neutralizing the alkali silicate with sulfuric acid to form silicic acid and an alkali sulfate, and heating the resulting solution containing silicic acid to convert the dissolved colloidal silicic acid into an insoluble form.

3. The process of removing from zinc solutions the last traces of iron and manganese which comprises boiling such solutions with hydrated silicic acid to convert the silicic acid into an insoluble form.

4. The process of removing from zinc sulfate solutions the last traces of iron and manganese which comprises adding a soluble alkali silicate, neutralizing the alkali silicate with sulfuric acid to form silicic acid and an alkali sulfate, and boiling the solution containing silicic acid to convert the dissolved silicic acid into an insoluble form.

5. The process of removing from zinc solutions the last traces of iron and manganese which comprises neutralizing sodium silicate in such solution with an acid to set free silicic acid, and boiling the resulting solution to convert the dissolved colloidal silicic acid into an insoluble form.

In testimony whereof I have signed this specification in the presence of two subscribing witnesses.

SHUNJIRO ARAKI.

Witnesses:
M. KIKUCHI,
W. EBIHARAH.